United States Patent [19]
McIntosh et al.

[11] 3,896,101
[45] July 22, 1975

[54] ADDITIVE FOR PLASTIC MATERIALS

[75] Inventors: Robert H. McIntosh; Ezekiel H. Hull, both of Greensboro, N.C.

[73] Assignee: Anthony B. Askew, Atlanta, Ga.

[22] Filed: Nov. 16, 1971

[21] Appl. No.: 199,327

Related U.S. Application Data

[63] Continuation-in-part of Ser. No. 139,265, April 30, 1971, Pat. No: 3,705,235.

[52] U.S. Cl. .................... 260/93.7; 252/1; 252/521; 260/94.9 GB
[51] Int. Cl.² ...................... C08K 3/24; C08K 5/17
[58] Field of Search ... 260/93.7, 94.9 GB, 94.9 GD; 252/1

[56] References Cited
UNITED STATES PATENTS 2,624,725  1/1953  Bjorksten et al. ............ 260/949 GD
2,992,199  7/1961  Coler et al. ................... 260/DIG. 16
3,441,553  4/1969  Rombusch et al. ............ 260/949 GB
3,639,518  2/1972  Davies et al. ................. 260/94.9 GB
3,658,744  4/1972  Brindell et al. .............. 260/DIG. 16

FOREIGN PATENTS OR APPLICATIONS 894,123  4/1962  United Kingdom

*Primary Examiner*—Edward J. Smith
*Attorney, Agent, or Firm*—Jones, Thomas & Askew

[57] ABSTRACT

An effective amount of unsymmetrical tertiary aliphatic amine and one of a Group IIa or IIb metal salt of a monocarboxylic acid having a carbon chain length of 1 to 4 when combined together and dispersed in a thermoplastic resin is a synergistically effective and long lasting additive which is effective in reducing the tendency of the thermoplastic material to acquire charges of static electricity.

7 Claims, No Drawings

ADDITIVE FOR PLASTIC MATERIALS

CROSS-REFERENCE TO RELATED APPLICATION

This application is a continuation-in-part of our co-pending application Ser. No. 139,265 filed Apr. 30, 1971 now U.S. Pat. No. 3,705,235.

This invention relates to the treatment of thermoplastic materials to reduce their tendency to acquire charges of static electricity. More specifically, this invention is directed to an additive material for use in synthetic thermoplastic materials which normally tend to generate and accumulate static electricity charges.

Articles comprising synthetic plastic materials tend to accumulate electrostatic charges on their surfaces during manufacture, treatment and use. These accumulated electrostatic charges are troublesome in that not only do they render the articles more difficult and dangerous to handle during manufacture and treatment, but also in that they greatly increase the tendency of the finished articles to accumulate unwelcomed dust in use. Many methods have been proposed to prevent the accumulation of static charges, none of which have been entirely satisfactory. External methods such as temperature and humidity control and dipping into aqueous surface active agent solutions have been employed in production operations but antistatic protection thereby is temporary and exists only when the synthetic plastic materials are exposed to such conditions. A great number of agents have also been proposed for treating the surface of synthetic resins and fibers to prevent the generation or accumulation of electrostatic charges. However, such treatments are generally temporary in nature since these agents are removed by washing, bleaching or abrasion.

All surface treatment methods, however, require additional handling of the formed articles from the synthetic plastic materials during such treatment. This is generally undesirable from a production handling viewpoint and undesirable to the ultimate user if repeated applications are necessary. While such a surface treatment is effective static protection of the articles is removed with washing or contact with water because of the high water solubility of most of the generally conventional surface active agents.

It is felt that internal modification of synthetic plastic materials would be effective in reducing static accumulation. Such internal modification would be superior to any surface treatment or coating because of the permanency achieved and could be accomplished by adding to the synthetic plastic materials an antistatic agent which is unreactive with and compatible with the synthetic plastic materials. These additives would also be stable up to the high temperatures at which the synthetic plastic materials are processed.

It is therefore one of the objects of the present invention to provide a method for suppressing electrostatic accumulation by the addition of an antistatic additive to the plastic material. Such an additive would be incorporated into the synthetic plastic composition thereby eliminating the necessity of repeated separate surface applications to obtain substantial antistatic protection over the service life of the article.

It is a further object of this invention to provide an antistatic agent for reducing the static generating and accumulating tendency of a wide variety of synthetic plastic materials. The agent should not react with the plastic compositions or seriously alter or change the physical properties of the composition blends when employed in amounts sufficient to produce effective antistatic protection.

According to the present invention therefore, it has been found that electrostatic generating and accumulating tendencies of thermoplastic materials may be suppressed or significantly reduced by incorporating therein a synergistically effective antistatic additive comprising an effective amount of an unsymmetrical tertiary aliphatic amine and one of a Group IIa or IIb metal salt of a monocarboxylic acid having a carbon chain length of 1 to 4. The antistatic additive may be added to the thermoplastic material in any conventional manner such as during the preparation of the plastic material or by milling it into the plastic material on hot rolls or by mixing it into dopes of a plastic material or by coating it onto pellets of the plastic material prior to extrusion as sheets, films, fibers or the like.

One of the most interesting and important features of the present plastic material composition is its unique ability to release the antistatic additive uniformly over the surface of articles formed from the material and to replace the antistatic additive when the surface concentration of the additive has been reduced. The additive is homogeneously distributed throughout the plastic material. The additive migrates through the body of the plastic material to continuously replenish the supply of additive on the surface of the plastic material to assure a long lasting surface concentration sufficient to inhibit the accumulation of static electricity charges thereon.

The antistatic additive of the present invention is an unsymmetrical aliphatic tertiary amine and optionally one of a Group IIa or Group IIb (from the Periodic Table) metal salt of a monocarboxylic acid having a carbon chain length of 1 to 4. Suitably, the tertiary amine includes two alkyl groups which have a carbon chain length of 1 to 4 atoms and one alkyl group which has a carbon chain length of 8 to 18 atoms. Preferably, the trialkyl amine is a dimethylalkyl amine wherein the alkyl group has from 10 to 14 carbon atoms. The most preferred amine of this invention is dimethyllaurylamine.

Suitably, the Group IIa or Group IIb metal salt of a monocarboxylic acid includes the barium, cadmium and strontium salts of acetic acid, propionic acid and butyric acid. The most preferred of these salts is barium acetate.

The most preferred antistatic additive is a mixture of dimethyllaurylamine and barium acetate in a part by weight ratio range of 3 to 1 and 1 to 3 for amine to acetate. A preferred part by weight ratio range for amine to acetate is 70 to 50 parts by weight to 30 to 50 parts by weight. A most preferred part by weight ratio is 60 parts amine to 40 parts acetate.

When blending the additive into a plastic material, a suitable concentration is 0.5 to 10% of additive in plastic by weight. A preferred concentration is 2 to 9% and a particularly preferred concentration is 3 to 7% by weight.

In preparing the amine-acetate antistatic additive for incorporation into a plastic material, a mixture of dimethyllaurylamine and barium acetate is most preferred. Granular barium acetate, of a particle size of approximately minus 4 mesh (U.S. Standard Screen Size), is added to the oily liquid dimethyllaurylamine, in a part by weight ratio as previously discussed, in a ball mill.

The ball mill tumble-mixes and grinds the mixture to a point where the particle sizes of the granular barium acetate are reduced sufficiently for the barium acetate to remain in suspension in the amine. Preferably, the acetate is reduced from minus 4 mesh to minus 325 mesh in the ball milling operation over a period of 72 hours.

An appropriate amount of the amine-acetate suspension is then added to a mixing machine containing a sufficient weight of thermoplastic pellets to produce a concentration of antistatic additive in plastic as discussed previously. During the tumble mixing operation the oily amine provides a filmy coating on the plastic pellets which holds the ground acetate on the pellets. As a result, the amine-acetate suspension adheres to the pellets during the tumbling operation and there is no accumulation or run-off of the amine-acetate suspension. The suspension adheres to such a degree that the coated pellets may be stored for a reasonable period of time without run-off or separation of the suspension from the pellets.

It has been found that thermoplastic materials are suitable for use in the present invention. Of the available thermoplastics, polyolefins are preferred and polyethylene and polypropylene are particularly preferred. When mixing the thermoplastic material with the amine-acetate suspension, it is preferred that the plastics be initially in pellet form of approximately one-sixteenth to one-eighth of an inch in diameter. Pelletized plastics are conventionally available from a number of suppliers.

After an appropriate amount of additive is mixed with and coated on a sufficient quantity of pelletized plastic material, the mixture is charged to a hopper of a conventional melt extruder where the mixture is melted and the additive is homogeneously distributed throughout the melted mass by the action of the extruder. The resultant molten mass of plastic material may then be formed into a sheet of plastic film and when such is done the sheet is even in texture, translucent and contains a uniform dispersion of the additive.

During the fusing operation in the melt extruder, temperatures as high as 230°C may be employed without degradation of the additive. Preferably, the fusion temperature should be between about 150°C to 200°C. The antistatic additive of this invention is quite advantageous for use in thermoplastics because it can withstand the heats of fusion required for most typical thermoplastics whereas known antistatic additives tend to degrade and discolor at these temperatures.

It has also been found that the molten mass from the melt extruder may be passed through a conventional spinneret to generate thermoplastic fibers containing the additive. These fibers may be gathered together to form conventional threads and yarns for numerous uses.

The present invention will be further described by the following examples:

EXAMPLE I

To 90 pounds of polyethylene pellets is added 10 pounds of an antistatic additive comprising equ... amounts of dimethyllaurylamine and barium acet... The pellets are coated with the oily suspension by tu... bling-mixing for twenty minutes. The coated pellets a... fused in test tubes immersed in an oil bath at a temperature of 190°C to 202°C for 20 minutes. Upon subsequent cooling to ambient temperature, the plastic cylinders from the test tubes are removed and sawed into discs approximately 10 mils in thickness. No degradation of the polyethylene is noted. The discs are rubbed and otherwise worked in attempt to build up static electricity charges thereon. The pellets so treated show a relatively low tendency to pick up dirt from the atmosphere when compared to untreated plastics which are rubbed and worked in the same fashion.

EXAMPLE II 97 pounds of polyethylene pellets and 3 pounds of an antistatic additive consisting of 1.8 pounds of dimethyllaurylamine and 1.2 pounds barium acetate are mixed in a tumble-mixing machine until the oily suspension of acetate in amine provides a filmy coating for the plastic pellets. The coated pellets are then added to the hopper of a melt extruder operating at a temperature of 180°C and a sheet of plastic material containing the additive is drawn from the extrusion head. As the sheet is passed over conventional handling rollers it is noted the typical amount of crackling and sparking which is associated with the handling of polyethylene sheets is absent and the sheet exhibits a lower tendency to pick up dust and dirt from the atmosphere.

The surface resistivity of this material is tested and compared to the surface resistivity of a sheet of polyethylene prepared according to Example II but without the addition of the antistatic agent. The results are as follows:

|  | Surface Resistivity |
|---|---|
| Film with additive | $3.75 \times 10^{10}$ ohm/sq. |
| Film without additive | $5.0 \times 10^{11}$ ohm/sq. |

An attempt is made to measure static decay for the film materials but no charge could be built up on the surfaces of the film with additive by a supply of power or by rubbing it. Static decay for the film without the additive is three seconds for a 90% decay from 5,000 volts to 500 volts.

While this invention has been described in detail with particular reference to preferred embodiments thereof, it will be understood that variations and modifications can be effected within the spirit and scope of the invention as described hereinbefore and as defined in the appended claims.

What is claimed is:

1. Antistatic plastic material having incorporated therein an effective amount of an additive having a decomposition temperature above the molding temperature of the plastic material, said additive consisting essentially of a mixture of dimethyllaurylamine and barium acetate.

2. Antistatic plastic material as disclosed in claim 1 wherein the plastic material contains from 0.5 to 10% by weight of a mixture of dimethyllaurylamine and barium aoetate in a part by weight ratio for amine to acetate of 3 to 1 to 1 to 3.

3. Antistatic plastic material as disclosed in claim 1 wherein the plastic material contains from 2 to 9% by eight of a mixture of dimethyllaurylamine and barium tate in a part by weight ratio for amine to acetate of 10 to 50 parts by weight amine to 30 to 50 parts by weight acetate.

4. Antistatic plastic material as disclosed in claim 1 wherein the plastic material contains from 3 to 7% by weight of a mixture of dimethyllaurylamine and barium acetate in a part by weight ratio for amine to acetate of 60 parts to 40 parts.

5. Antistatic plastic material including 3 to 7% by weight of an evenly distributed additive consisting essentially of a mixture of dimethyllaurylamine and barium acetate in a part by weight ratio in the mixture of 3 to 1 to 1 to 3.

6. A molded, cast, extruded or calendered article of the antistatic plastic material of claim 1.

7. Antistatic additive for incorporation into thermoplastic materials, the additive consisting essentially of a mixture of dimethyllaurylamine and barium acetate in a part by weight ratio within the mixture of 3 to 1 to 1 to 3.

* * * * *